(12) United States Patent
Liu et al.

(10) Patent No.: US 8,343,445 B2
(45) Date of Patent: Jan. 1, 2013

(54) SYSTEM AND METHOD FOR ENHANCED REMOVAL OF $CO_2$ FROM A MIXED GAS STREAM

(75) Inventors: Zheng Liu, Knoxville, TN (US); Naresh B. Handagama, Knoxville, TN (US)

(73) Assignee: ALSTOM Technology Ltd, Baden (CH)

( * ) Notice: Subject to any disclaimer, the term of this patent is extended or adjusted under 35 U.S.C. 154(b) by 764 days.

(21) Appl. No.: 12/406,360

(22) Filed: Mar. 18, 2009

(65) Prior Publication Data

US 2009/0238731 A1  Sep. 24, 2009

Related U.S. Application Data

(60) Provisional application No. 61/038,494, filed on Mar. 21, 2008.

(51) Int. Cl.
*B01D 8/00* (2006.01)
(52) U.S. Cl. .............. 422/611; 261/94; 261/95; 261/98; 95/139; 95/161; 95/166
(58) Field of Classification Search .................. 422/611; 261/94, 95, 98; 95/139, 166, 161; 423/228, 423/232
See application file for complete search history.

(56) References Cited

U.S. PATENT DOCUMENTS

| | | | |
|---|---|---|---|
| 3,932,582 A | 1/1976 | Eickmeyer | |
| 4,275,018 A * | 6/1981 | Braun | 261/94 |
| 5,137,702 A | 8/1992 | Yan | |
| 6,187,277 B1 * | 2/2001 | Kirschner | 423/220 |
| 6,312,655 B1 * | 11/2001 | Hesse et al. | 423/232 |
| 7,067,456 B2 * | 6/2006 | Fan et al. | 502/400 |
| 7,235,677 B2 * | 6/2007 | Chipman et al. | 549/536 |
| 7,601,315 B2 * | 10/2009 | Ouimet | 423/228 |
| 7,754,102 B2 * | 7/2010 | Zhang et al. | 252/184 |
| 7,789,945 B2 * | 9/2010 | Lechnick et al. | 95/236 |
| 7,964,170 B2 * | 6/2011 | Singh | 423/224 |
| 2004/0231512 A1 | 11/2004 | Slayzak et al. | |
| 2006/0213224 A1 | 9/2006 | Fradette et al. | |
| 2010/0074828 A1 * | 3/2010 | Singh | 423/432 |

FOREIGN PATENT DOCUMENTS

| WO | WO 2006/022885 | 3/2006 |
|---|---|---|
| WO | WO 2008/021700 | 2/2008 |

OTHER PUBLICATIONS

PCT International Search Report and The Written Opinion of the International Searching Authority dated Aug. 7, 2009—(PCT/US2009/037618).
Database WPI Week 198121—Thomas Scientific, London, GB: AN 1981-37745D—XP002534493 & SU 762 943 B (Vnipigaz Natur Gas) Sep. 15, 1980.
Xu X et al: "Preparation and characterization of novel CO2 "molecular basket" adsorbents based on polymer-modified mesoporous molecular sieve MCM-41" Microporous and Mesoproous Materials, Elsevier Science Publishing, New York, US, vol. 62, No. 1-2, Aug. 14, 2003, pp. 29-45.
Official Action from the Patent Office of the Russian Federation, dated Oct. 11, 2012, for Application No. 2010143044, based off of PCT Application No. PCT/US2009/037618.

* cited by examiner

*Primary Examiner* — Nina Bhat
(74) *Attorney, Agent, or Firm* — Robert D. Crawford

(57) ABSTRACT

A solvent based flue gas processing system for removing $CO_2$ from a flue gas stream is provided in which a catalyst coated on a support structure is provided. The catalyst selected is capable of retaining $CO_2$, at least for a period of time, thereby increasing the residence time of $CO_2$ and solvent.

20 Claims, 7 Drawing Sheets

SYSTEM AND METHOD FOR ENHANCED REMOVAL OF $CO_2$ FROM A MIXED GAS STREAM

CROSS REFERENCE TO RELATED APPLICATION(S)

This application claims priority to U.S. provisional application entitled, "System and Method For Enhanced Removal of $CO_2$ From a Mixed Gas Stream," having U.S. Ser. No. 61/038,494, filed Mar. 21, 2008, the disclosure of which is entirely incorporated herein by reference; and is related to non-provisional U.S. patent application having Ser. No. 12/406,289, filed on Mar. 18, 2009, which claimed priority to U.S. provisional patent application having Ser. No. 61/038,467, filed on Mar. 21, 2008.

FIELD OF THE INVENTION

The proposed invention relates to a system and method for removing carbon dioxide ($CO_2$) from a process gas stream containing carbon dioxide and sulphur dioxide. More particularly, the proposed invention is directed to a solvent based flue gas processing system for removing $CO_2$ from a flue gas stream in which a catalyst is provided to increase the efficiency of the solvent in capturing $CO_2$ from the flue gas stream or in regenerating the solvent.

BACKGROUND

In the combustion of a fuel, such as coal, oil, peat, waste, etc., in a combustion plant, such as those associated with boiler systems for providing steam to a power plant, a hot process gas (or flue gas) is generated. Such a flue gas will often contain, among other things, carbon dioxide ($CO_2$) The negative environmental effects of releasing carbon dioxide to the atmosphere have been widely recognised, and have resulted in the development of processes adapted for removing carbon dioxide from the hot process gas generated in the combustion of the above mentioned fuels. One such system and process has previously been disclosed and is directed to a single-stage Chilled Ammonia based system and method for removal of carbon dioxide ($CO_2$) from a post-combustion flue gas stream.

Known solvent based $CO_2$ capture systems, such as ammonia based systems and processes (CAP) provide a relatively low cost means for capturing/removing $CO_2$ from a gas stream, such as, for example, a post combustion flue gas stream. An example of such a system and process has previously been disclosed in pending patent application PCT/US2005/012794 (international Publication Number: WO 2006/022885/Inventor: Eli Gal)), filed on 12 Apr. 2005 and titled Ultra Cleaning of Combustion Gas Including the Removal of $CO_2$. In this process the absorption of $CO_2$ from a flue gas stream is achieved by contacting a chilled ammonia ionic ammonia solution (or slurry) with a flue gas stream that contains $CO_2$.

FIG. 1A is a diagram generally depicting a flue gas processing system 15 for use in removing various pollutants from a flue gas stream FG emitted by the combustion chamber of a boiler system 26 used in a steam generator system of, for example, a power generation plant. This system includes a $CO_2$ removal system 70 that is configured to remove $CO_2$ from the flue gas stream FG before emitting the cleaned flue gas stream to an exhaust stack 90 (or alternatively additional processing). It is also configured to output $CO_2$ removed from the flue gas stream FG. Details of $CO_2$ removal system 70 are generally depicted in FIG. 1B.

With reference to FIG. 1B, $CO_2$ removal System 70 includes a capture system 72 for capturing/removing $CO_2$ from a flue gas stream FG and a regeneration system 74 for regenerating ionic ammonia solution used to remove $CO_2$ from the flue gas stream FG. Details of capture system 72 are generally depicted in FIG. 1C.

With reference to FIG. 1C and FIG. 1D, a capture system 72 of a $CO_2$ capture system 70 (FIG. 1A) is generally depicted. In this system, the capture system 72 is a solvent based $CO_2$ capture system. More particularly, in this example, the solvent used is chilled ammonia. In a chilled ammonia (CAP) based system/method for $CO_2$ removal, an absorber vessel is provided in which an absorbent ionic ammonia solution (ionic ammonia solution) is contacted with a flue gas stream (FG) containing $CO_2$. The ionic ammonia solution is typically aqueous and may be composed of, for example, water and ammonium ions, bicarbonate ions, carbonate ions, and/or carbamate ions. An example of a known CAP $CO_2$ removal system is generally depicted in the diagrams of FIG. 1C and FIG. 1D.

With reference to FIG. 1C, an absorber vessel 170 is configured to receive a flue gas stream (FG) originating from, for example, the combustion chamber of a fossil fuel fired boiler 26 (see FIG. 1A). It is also configured to receive a lean ionic ammonia solution supply from regeneration system 74 (see FIG. 1B). The lean ionic ammonia solution is introduced into the vessel 170 via a liquid distribution system 122 while the flue gas stream FG is also received by the absorber vessel 170 via flue gas inlet 76.

The ionic ammonia solution is put into contact with the flue gas stream via a gas-liquid contacting device (hereinafter, mass transfer device, MTD) 111 used for contacting the flue gas stream with solvent and located in the absorber vessel 170 and within the path that the flue gas stream travels from its entrance via inlet 76 to the vessel exit 77. The gas-liquid contacting device 111 may be, for example, one or more commonly known structured or random packing materials, or a combination thereof.

Once contacted with the flue gas stream, the ionic ammonia solution acts to absorb $CO_2$ from the flue gas stream, thus making the ionic ammonia solution "rich" with $CO_2$ (rich solution). The rich ionic ammonia solution continues to flow downward through the mass transfer device and is then collected in the bottom 78 of the absorber vessel 170. The rich ionic ammonia solution is then regenerated via regenerator system 74 (see FIG. 1B) to release the $CO_2$ absorbed by the ionic ammonia solution from the flue gas stream. The $CO_2$ released from the ionic ammonia solution may then be output to storage or other predetermined uses/purposes. Once the $CO_2$ is released from the ionic ammonia solution, the ionic ammonia solution is said to be "lean". The lean ionic ammonia solution is then again ready to absorb $CO_2$ from a flue gas stream and may be directed back to the liquid distribution system 121 whereby it is again introduced into the absorber vessel 170. Details of regenerating system 74 are shown in FIG. 1E. System 74 includes a regenerator vessel 195. Regenerator vessel 195 is configured to receive a rich solution feed from the capture system 72 and to return a lean solution feed to the capture system 72 once $CO_2$ has been separated from the rich solution.

During the regeneration process, the rich ionic ammonia solution is heated so that $CO_2$ contained in the solution separates from the chilled ammonia solution. Once separated from the $CO_2$, ammonia (ammonia slip) is returned to the capture system for use in capturing further $CO_2$ from a gas stream.

These currently known solvent based $CO_2$ capture technologies typically consume approximately 20-30% of the power generated by the power generation system in order for the $CO_2$ capture process to work effectively. In addition, these technologies often require a large portion of thermal energy generated by boiler/re-boiler functions (reboiler duty) in order to regenerate amine solution for re-use in capturing $CO_2$ from a flue gas stream. In short, while there are known technologies for capturing $CO_2$ from a flue gas stream, they require immense amounts of energy in order to function well. Further, in order to maximize/optimize the amount of time that flue gas is in contact with amine, the physical size of the absorber and/or re-generator tanks in a typical system must be very large. The cost to design and implement these towers of such large scale is very high. Additionally, the physical space that is required on-site to accommodate these vessels is significant. Where on-site space is limited, additional steps must be taken to implement the vessels/system in the limited space, if possible.

SUMMARY OF THE INVENTION

Embodiments of the present invention provide for flue gas processing system for use with a fossil fuel fired boiler. Briefly described, in architecture, one embodiment of the system, among others, can be implemented as a flue gas processing system that includes an absorber tower configured to receive a mixed gas stream containing carbon dioxide and to contact it with a solvent; and the absorber tower comprises packing materials that are coated with a catalyst.

Embodiments of the present invention can also be viewed as providing methods for processing a mixed gas stream wherein the method includes the steps of: receiving a flue gas stream from the combustion chamber of a boiler; contacting the flue gas stream with a solvent and contacting the solvent with a catalyst.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views. The invention will now be described in more detail with reference to the appended drawings in which.

DISCUSSION

Figure 1A:
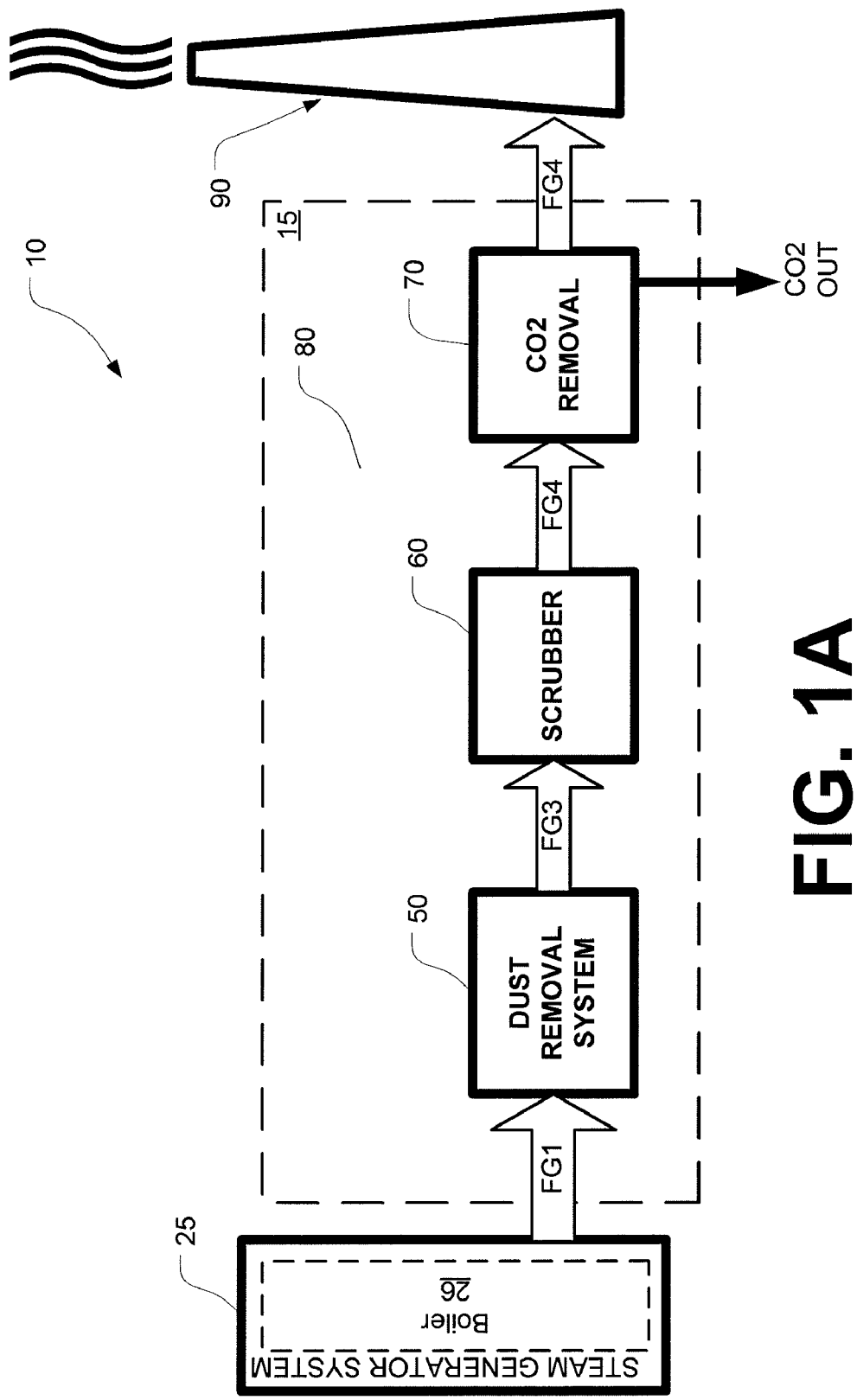
FIG. 1A-FIG. 1C are diagram generally depicting a typical flue gas processing system 15 with provisions for $CO_2$ removal.
Figure 1B:
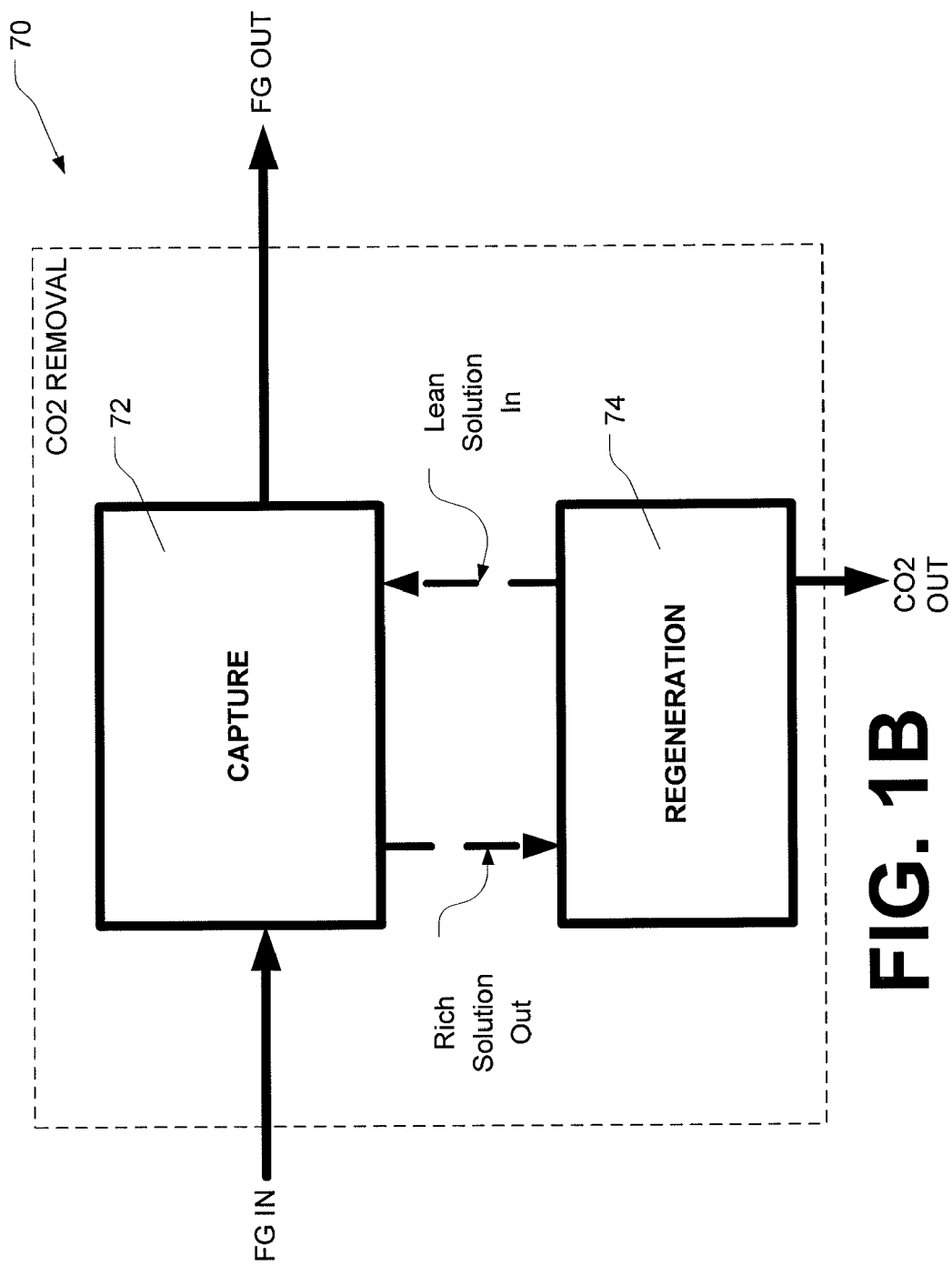
Figure 1C:
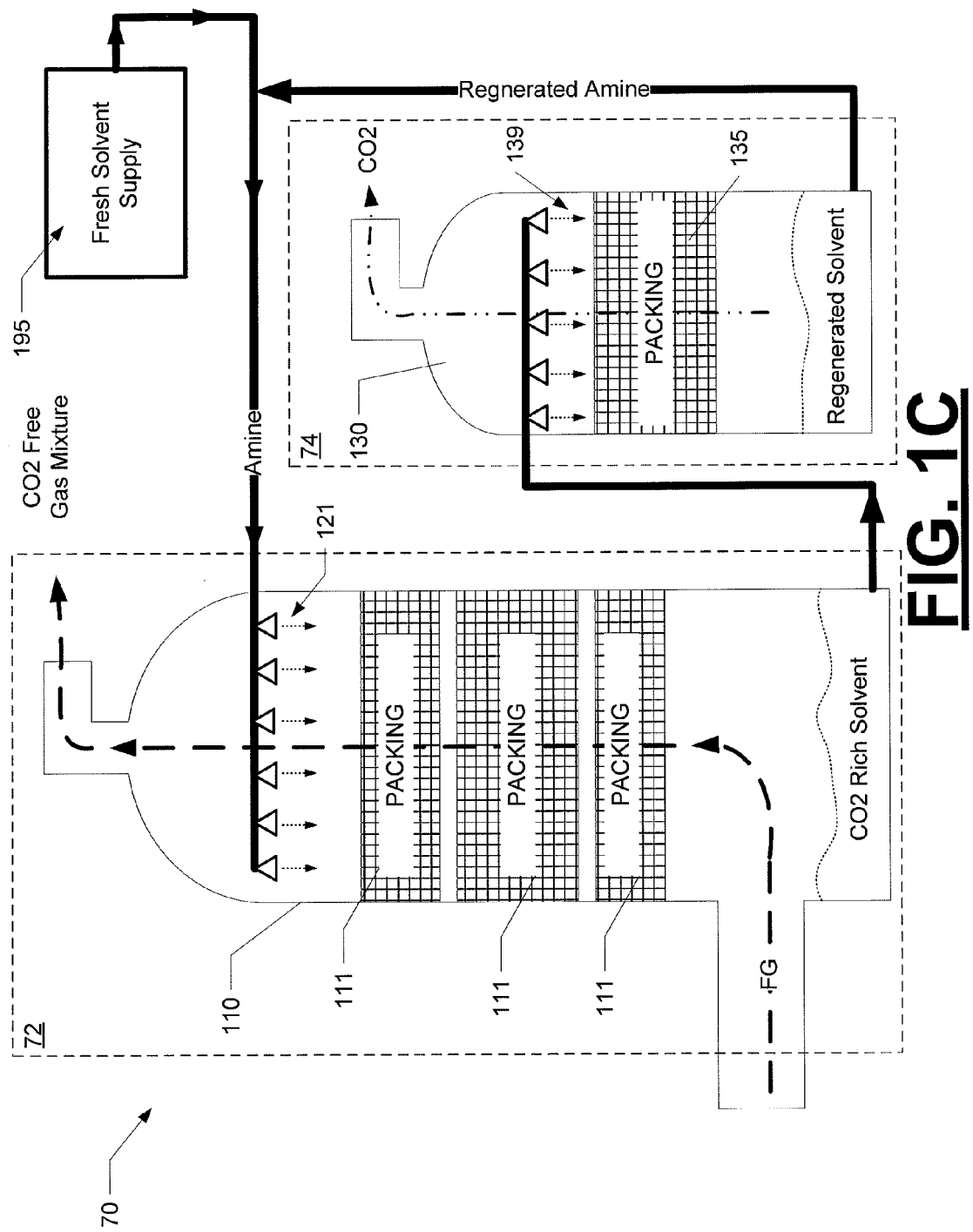
Figure 2A:
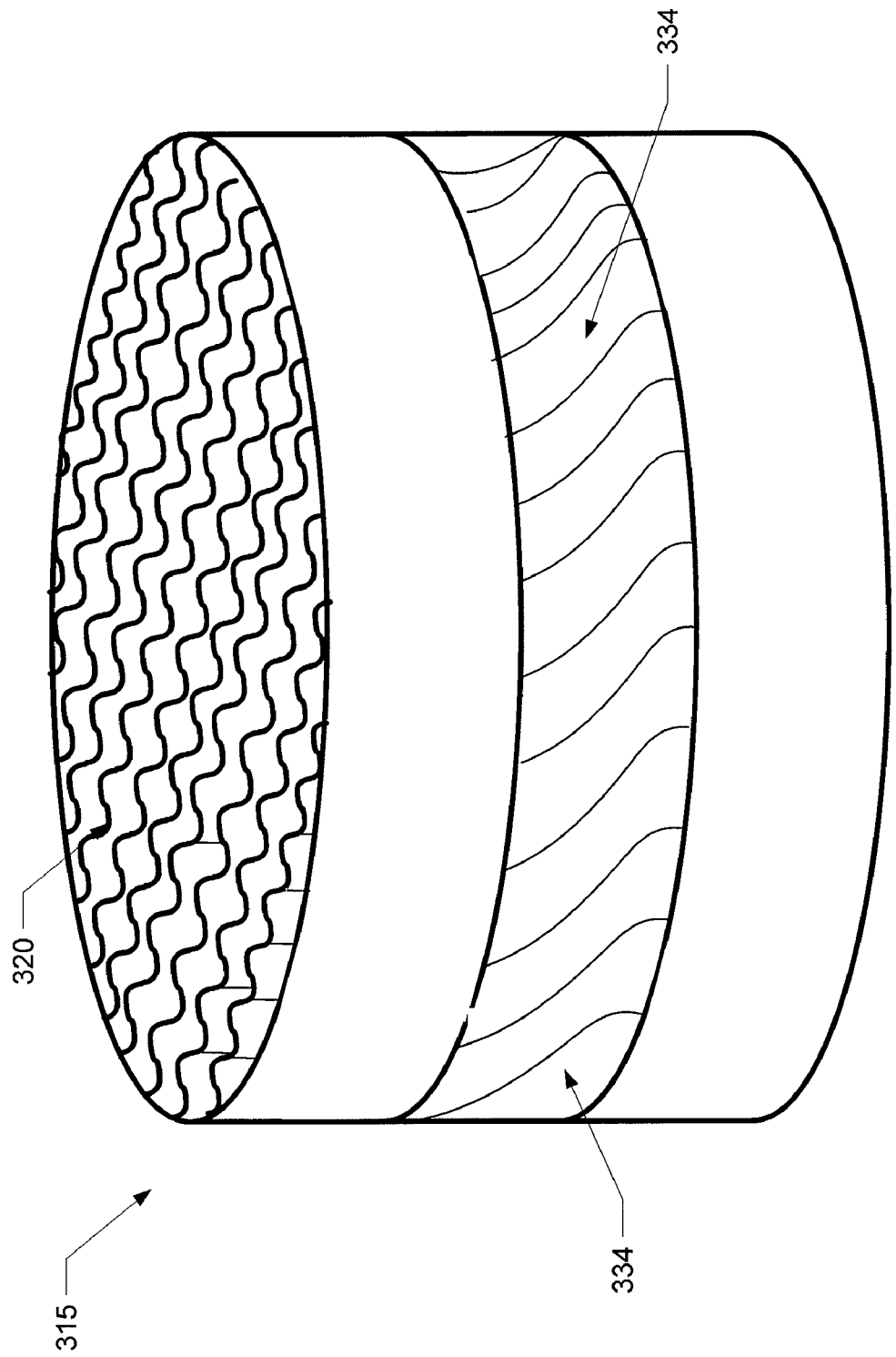
FIG. 2A-FIG. 2D are diagrams generally illustrating an example of packing materials 315 on which a catalyst capable of holding $CO_2$ has been immobilized on the wall/surfaces of the packing materials 315.

The proposed invention is directed to increasing $CO_2$ removal efficiency in a solvent based (amine/ammonia) $CO_2$ removal system/process. In one embodiment, generally depicted in FIG. 2A-FIG. 3, a mass transfer device MTD 315 (or packing materials) composed of, for example, one or more support structures 320 is provided and disposed within the interior of an absorber vessel 110 (FIG. 3). The support structure(s) 320 is coated with a catalyst 425.

Figure 2B:
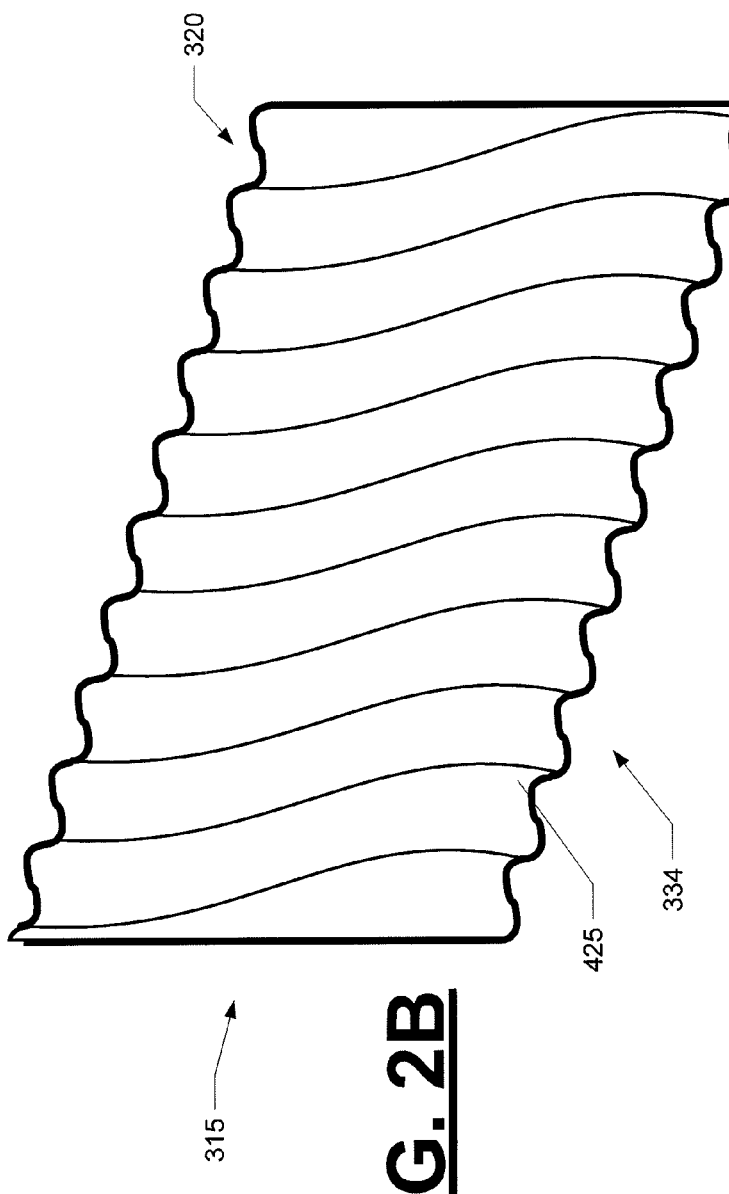
Figure 2C:
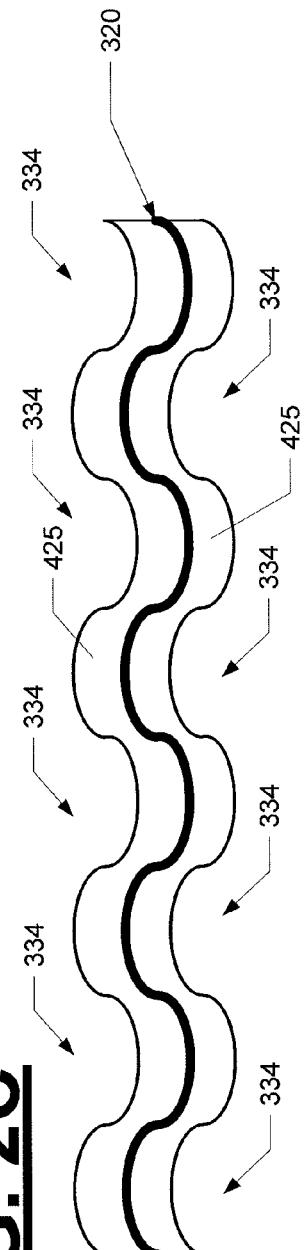
Figure 2D:
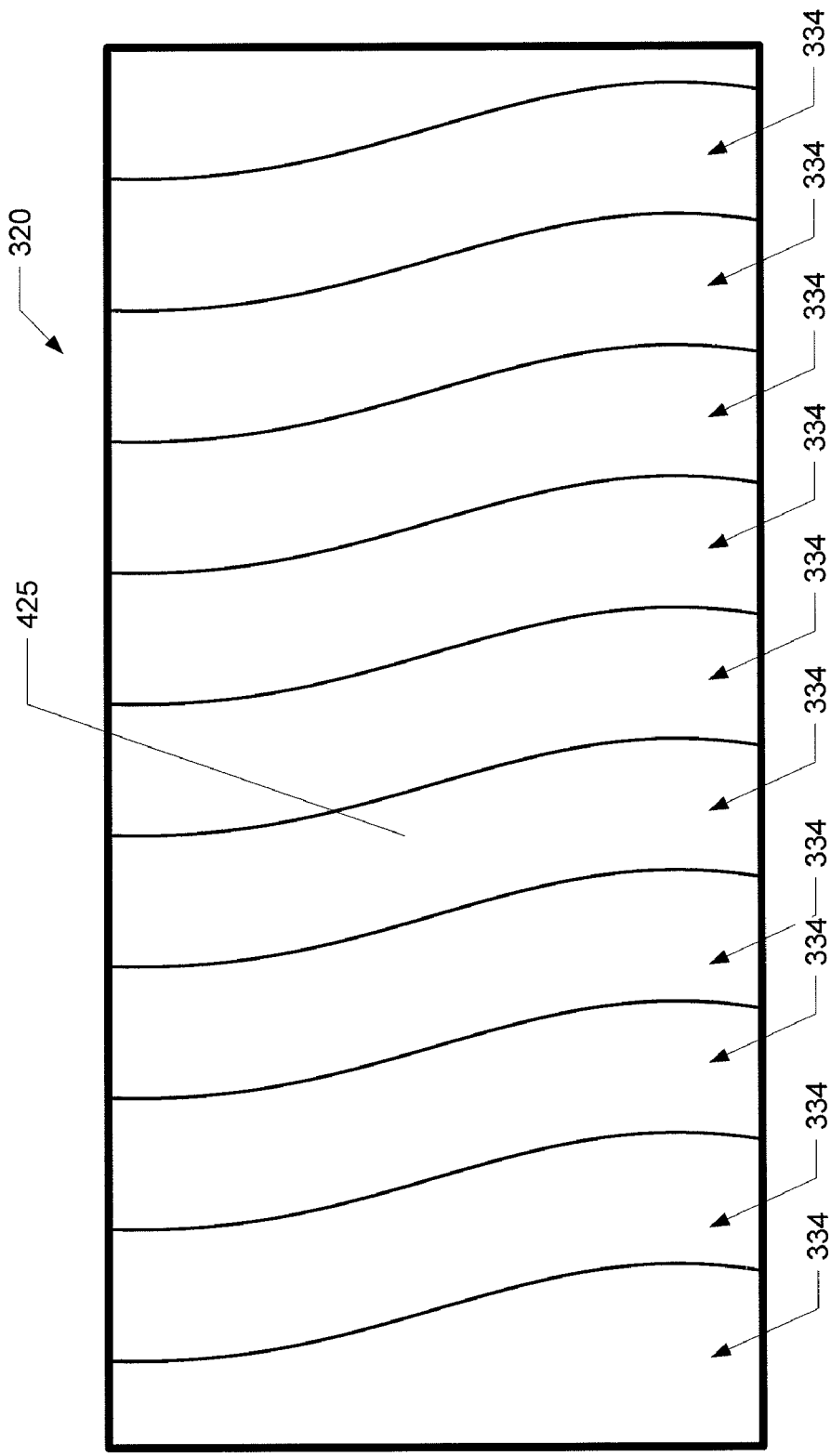
Figure 3:
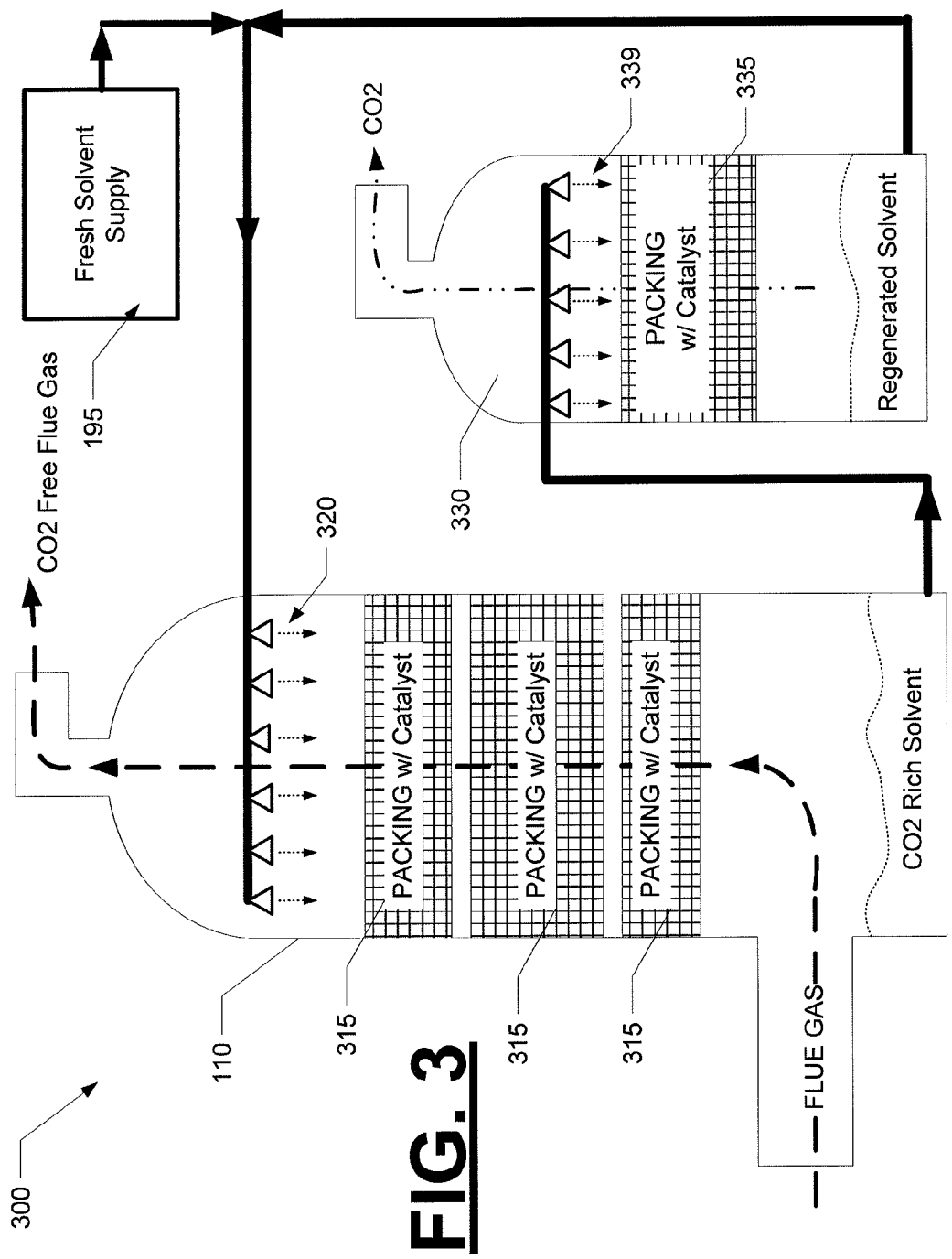
FIG. 3 is a diagram generally depicting relevant portions of an amine or ammonia based $CO_2$ capture system 70 in which absorber 110 and regenerator 330 are provided with packing materials 315 and 335, respectively that have been coated with a catalyst capable of holding $CO_2$.

FIG. 2A-FIG. 2D are diagrams generally depicting packing materials 315 that have been coated with a solid material capable of holding $CO_2$ 425. FIGS. 2B and 2C shows that the packing materials 315 may be composed of, for example, a series of corrugated support structures 320 arranged in close proximity to each other so as to form a series of channels 334 through which flue gas entering the absorber vessel 110 flow. The catalyst 425 is coated on one or more surfaces of each corrugated support structures 320.

The catalyst coated on the support structure(s) 320 will preferably be a heterogeneous catalyst. Further the catalyst 425 will preferably have a moderate basicity/interaction with $CO_2$ and high specific surface area, for example, 100-1000 $m^2/g$. Preferably the catalyst 425 will be a commercially available catalyst having a high BET (Brunauer, Emmett and Teller) surface area and porosity (polymer, metal oxides, $SiO_2$, molecular sieves, etc.), which should be able to store or retain $CO_2$ with moderate interaction (basicity) with the catalyst. Surface basicity may be tuned by, for example, surface modification using alkali/alkali earth metal or transition metal oxide in order to enhance $CO_2$ adsorption capacity. The catalyst 425 can be immobilized onto the support structures (s) 320 by using, for example, known wash-coating techniques.

In operation, the flue gas stream is contacted with the packing materials 315 and thus, the support structure 320 that is coated (layered) with the catalyst 425 capable of holding/retaining $CO_2$ from the flue gas stream for at least a period of time. By retaining $CO_2$ on the catalyst disposed on the support structure 320, the $CO_2$ is exposed to solvent flowing through the packing materials 115, counter current to the flue gas stream, for a longer period of time, thus increasing the likelihood that the $CO_2$ will be captured by the solvent.

In this way, it is possible to indirectly increase the residence time of the $CO_2$ contained in a flue gas stream with the solvent (amine/ammonia) in absorber tower 110 and thus, increase the amount of $CO_2$ that will be adsorbed onto the surface of the solid materials. In order to do this, it is proposed in one embodiment of the proposed invention, that a solid material capable of holding (adsorbing) $CO_2$ for a period of time be immobilized (coated) on one or more surfaces of the packing materials 315 used in the absorber tower 110 (FIG. 3)) of a solvent based $CO_2$ capture system.

FIG. 3 is a diagram generally depicting relevant portions of an solvent based (example: amine or ammonia) based $CO_2$ capture system 300 for use in processing a flue gas stream from, for example, a fossil fuel fired boiler of a power generation plant. The system 300 includes an absorber tower 110 that includes packing materials 315 that are coated with a catalyst 425 on one or more surfaces. A regeneration tower 330 is provided and includes packing materials 339 that are coated with a catalyst 425 on one or more surfaces.

While the invention has been described with reference to a number of preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed:

1. A gas processing system comprising:
   an absorber including a vessel configured to receive a mixed gas stream containing carbon dioxide and to contact the mixed gas stream with a solvent; wherein the absorber comprises packing materials disposed in the vessel, the packing material including a catalyst disposed thereon for the catalyst to promote the capture of carbon dioxide from within the mixed gas stream to make the solvent rich in carbon dioxide.

2. The system of claim 1 wherein the catalyst is a heterogeneous catalyst.

3. The system of claim 1 wherein the solvent is amine based.

4. The system of claim 1 wherein the packing materials are coated/immobilized with the catalyst.

5. The system of claim 1 wherein the solvent is ammonia based.

6. The system of claim 1, wherein the catalyst includes a high BET surface area and porosity.

7. The system of claim 1, wherein the catalyst retains the carbon dioxide for a period of time to increase the likelihood the carbon dioxide will be captured by the solvent.

8. The system of claim 1, wherein packing materials are coated/immobilized with the catalyst.

9. The system of claim 1, wherein the catalyst activates carbon dioxide adsorbed onto its surfaces and catalyses carbonation/bi-carbonation and carbonation of the solvent with carbon dioxide.

10. A gas processing system comprising:
    a regenerator including a vessel configured to receive a solvent stream rich in carbon dioxide;
    wherein the regenerator comprises packing materials disposed in the vessel, the packing materials including a catalyst disposed thereon to promote the release of carbon dioxide within the solvent stream.

11. The system of claim 10 wherein the catalyst is a heterogeneous catalyst.

12. The system of claim 10, wherein the solvent is amine based.

13. The system of claim 10, wherein the solvent is ammonia based.

14. The system of claim 10, wherein the catalyst includes a high BET surface area and porosity.

15. The system of claim 10, wherein the catalyst retains the carbon dioxide for a period of time to increase the likelihood the carbon dioxide will be captured by the solvent.

16. The system of claim 10, wherein the catalyst activates carbon dioxide adsorbed onto its surfaces and catalyses carbonation/bi-carbonation and carbonation of the solvent with carbon dioxide.

17. The system of claim 10, wherein the catalyst catalyses the decomposition of products formed from the carbonation/bi-carbonation and carbonation of amine with carbon dioxide.

18. The system of claim 10, wherein the catalyst catalyses the decomposition of products formed from the reaction/interaction of ammonia with $CO_2$.

19. A mixed gas processing system comprising:
    an absorber including a first vessel configured to receive a mixed gas stream containing carbon dioxide and to contact the mixed gas stream with a solvent, the absorber comprising packing materials disposed in the first vessel to provide a solvent stream rich in carbon dioxide; and
    a regenerator including a second vessel configured to receive the solvent stream rich in carbon dioxide; whereby the regenerator comprises packing materials disposed in the second vessel to provide a solvent stream lean in carbon dioxide to the absorber and provide a carbon dioxide rich stream;
    wherein at least one of the packing materials of the absorber and the packing materials of the regenerator includes a catalyst disposed thereon to promote the release of carbon dioxide within the mixed gas stream and solvent stream rich in carbon dioxide, respectively.

20. The system of claim 19, wherein the packing materials are coated/immobilized with the catalyst.

* * * * *